United States Patent [19]

Stevens, Jr.

[11] Patent Number: 4,887,671

[45] Date of Patent: Dec. 19, 1989

[54] FRACTURING WITH A MIXTURE OF CARBON DIOXIDE AND ALCOHOL

[75] Inventor: James F. Stevens, Jr., Houston, Tex.

[73] Assignee: Texaco, Inc., White Plains, N.Y.

[21] Appl. No.: 289,094

[22] Filed: Dec. 23, 1988

[51] Int. Cl.$^4$ .................. E21B 43/26; E21B 43/267

[52] U.S. Cl. ................................ 166/308; 166/280; 252/8.551

[58] Field of Search .............. 166/259, 271, 280, 281, 166/308; 252/8.551, 8.554

[56] References Cited

U.S. PATENT DOCUMENTS

| | | | |
|---|---|---|---|
| 3,664,422 | 5/1972 | Bullen | 166/308 |
| 4,156,464 | 5/1979 | Hussin | 166/308 |
| 4,324,668 | 4/1982 | Harris | 166/307 X |
| 4,374,545 | 2/1983 | Bullen et al. | 166/308 X |
| 4,393,934 | 7/1983 | Savins et al. | 166/256 X |
| 4,400,034 | 8/1983 | Chew | 166/259 X |
| 4,519,455 | 5/1985 | Holtmeyer et al. | 166/309 X |
| 4,567,947 | 2/1986 | Mzik | 166/308 |

*Primary Examiner*—George A. Suchfield

*Attorney, Agent, or Firm*—Jack H. Park; Kenneth R. Priem; Harold J. Delhommer

[57] ABSTRACT

The invention is a method of fracturing an underground formation penetrated by a wellbore, which comprises injecting into a formation a mixture of carbon dioxide and a polar alcohol or polar glycol additive at a temperature and pressure above the critical temperature and pressure of carbon dioxide. The alcohol or glycol additive should have less than about 9 carbon atoms and comprises about 0.1% to about 10% by weight of the injected mixture. The mixture is injected with sufficient volume and pressure to cause a fracture to be formed in the underground formation.

7 Claims, No Drawings

FRACTURING WITH A MIXTURE OF CARBON DIOXIDE AND ALCOHOL

BACKGROUND OF THE INVENTION

This invention relates to a fracturing method for improving hydrocarbon recovery. More particularly, the invention is a method of fracturing an underground formation by injecting a mixture of carbon dioxide and a polar alcohol or polar glycol.

Underground formations are frequently fractured to stimulate the production of oil and gas. Fracturing may occur by injecting a fracturing fluid of liquid, gas or 2-phase fluid down a wellbore at sufficient pressure and flow rate to fracture the underground formation. Optionally, a proppant material such as sand, fine gravel, sintered bauxite, glass beads or the like can be introduced into the fractures to keep them open. The propped fracture provides larger flow channels through which an increased quantity of hydrocarbons can flow. A proppant material may also be carried into the formation by the fracturing fluid.

One fracturing technique has been to utilize a liquified, normally gaseous fluid such as carbon dioxide. U.S. Pat. No. 3,195,634 discloses a method of fracturing an underground formation with a liquid mixture of carbon dioxide and water. This fracturing fluid optionally includes a gelling agent and proppant material. Upon pressure release at the wellhead, the liquid carbon dioxide vaporizes and flows from the formation.

Liquid carbon dioxide fracturing has been performed in the field on numerous wells. The advantages and limitations of carbon dioxide fracturing are discussed in Sinal, M. L. et al., "Liquid $CO_2$ Fracturing: Advantages and Limitations," The Journal of Canadian Petroleum Technology, Sept.–Oct. 1987, pp. 26–30. The article states that liquid $CO_2$ fracture treatments have been primarily used on gas wells as opposed to oil wells since gas formations can take maximum advantage of the smaller fractures created by carbon dioxide fracturing. Carbon dioxide is injected directly into the formation as a liquid and pumped with conventional frac equipment. In order to maintain adequate viscosity to generate a fracture with sufficient for sand injection, it is believed that carbon dioxide must remain in its liquid phase. This requires the bottom-hole temperature to be reduced to 31° C. or less, the critical temperature of carbon dioxide.

The chief advantages of liquid carbon dioxide fracture treatments are the elimination of formation damage associated with conventional frac fluids. Since carbon dioxide exists in its vapor phase at reservoir temperatures and pressures, carbon dioxide fracturing results in zero residual frac fluid saturation. In gas reservoirs, this completely eliminates any relative permeability or capillary pressure damage around the fracture face.

A second major advantage is that the evaluation of a fractured zones' potential is almost immediate because of rapid clean-up. The substantial energy provided carbon dioxide results in the elimination of all residual liquid left in the formation from the frac fluid.

Third, fracturing with carbon dioxide is economical. Costs for frac fluid clean-up and associated rig time is considerably less than with conventional frac fluids. Swabbing of the well is completely eliminated as a post-frac treatment, and no disposal of recovered frac fluid is required.

The main disadvantage of carbon dioxide fracturing is the low viscosity of the fluid. Proppant weight and concentration are significantly less than that which can be carried by a conventional frac fluid. Fluid leak-off is also high due to the low viscosity. Consequently, carbon dioxide fracturing is not applicable to high permeability reservoirs.

The New Mexico Petroleum Recovery Research Center has performed tests with the use of high molecular weight polymers for increasing carbon dioxide viscosity. Extensive testing on a number of commercially available polymers has failed to find a solution. High molecular weight polymers do not have a sufficient solubility to alter carbon dioxide viscosity. These tests have been reported in Heller, J. P., Dandge, D. K., Card, R. G., and Donaruma, L. G., "Direct Thickeners for Mobility Control of $CO_2$ Floods," SPE Journal, October 1985.

Two publications have noted relatively large increases in carbon dioxide densities with the addition of relatively low molecular weight compounds. These publications did not, however, mention viscosity. See Paulaitis, M. E., Penninger, J. M. L., Gray, Jr., R. D., and Davidson, P., Chemical Engineering at Supercritical Fluid Conditions, Ann Arbor Science, pg. 31–80 (1983); and Snedaker, R. A., Ph.D. Thesis entitled "Phase Equilibrium In Systems with Supercritical Carbon Dioxide," Princeton University (1957).

The ability to predict the viscosity of a carbon dioxide and decane mixture by two correlations between density and viscosity was compared with actual measurements in Cullick, A. S. and Mathis, M. L., Journal of Chemical Engineering Data, Vol. 29, pg. 393–6, (1984).

SUMMARY OF THE INVENTION

The invention is a method of fracturing an underground formation penetrated by a wellbore, which comprises injecting into a formation a mixture of carbon dioxide and a polar alcohol or polar glycol additive at a temperature and pressure above the critical temperature and pressure of carbon dioxide. The alcohol or glycol additive should have less than about 9 carbon atoms and comprises about 0.1% to about 10% by weight of the injected mixture. The mixture is injected with sufficient volume and pressure to cause a fracture to be formed in the underground formation.

DETAILED DESCRIPTION

The addition of a polar alcohol or polar glycol additive to a carbon dioxide fracturing fluid produces a fracturing fluid with a much higher viscosity than pure carbon dioxide. Thus, the invention fracturing method decreases the viscosity disadvantage associated with carbon dioxide fracturing.

More specifically, the invention method of fracturing an underground formation comprises injecting into an underground formation through a wellbore a mixture of carbon dioxide and a polar alcohol or polar glycol additive at a temperature and pressure above the critical temperature and pressure of carbon dioxide. The alcohol or glycol additive has less than about 9 carbon atoms and comprises about 0.1% to about 10%, preferably about 1% to about 4% by weight of the injected mixture. The mixture must be injected with sufficient volume and pressure to cause a fracture to be formed in the underground formation.

Optionally, the fracturing fluid may contain proppant materials, surfactants, an emulsion or foam, and gelling agents. The proppant material can comprise, for example, sand, gravel, glass beads, sintered bauxite, resin-coated sand or the like. The proppant material can be mixed with the carbon dioxide mixture or injected after the fracturing by the carbon dioxide mixture. The amount of proppant may be varied to provide the desired amount of proppant in the formation. It may be admixed from slightly higher than 0 pounds of proppant per barrel of injected liquid up to as many pounds of proppant material as may be pumped and carried by the injected carbon dioxide mixture, or subsequent proppant injection fluid.

After the introduction of the estimated volume of fracturing fluid necessary to fracture the formation and transport the optional proper material, the wellbore is preferably shut-in for a period of time sufficient to permit stabilization of the underground formation. The shut-in period may be from several minutes to an excess of about 12 hours, and preferably, in the range of about 1 to 2 hours. After the underground formation is stabilized, the well is opened under controlled conditions and examined. The carbon dioxide gas will carry from the formation substantially all the liquids present in the fracturing area which leaves the formation and wellbore clean and ready for the commencement of production.

The polar alcohols and glycols which may be employed as invention additives include methanol, ethanol, propanol, isopropanol, butanol, isobutanol, pentanol, hexanol, heptanol, octanol, ethylene glycol, propylene glycol, butylene glycol, diethylene glycol, and related homologues and derivatives. As cost is a prime consideration for any material injected underground, the cheapest invention additives, methanol, ethanol and ethylene glycol are preferred. Because of its carbon dioxide viscosity enhancing capabilities, ethylene glycol is the most preferred additive. Two or more additives may be also placed in the mixture to enhance the viscosity of carbon dioxide in a ternary system.

It is believed that the polar alcohols and glycols mentioned above are effective in increasing carbon dioxide viscosity due in part to their polar structure. Such structure is believed to be responsible for dipolar bonding between molecules. It is also believed that glycols in general are more effective viscosity enhancing additives due to their extra hydroxyl group as compared to the other polar alcohols. In addition, ethylene glycol has a substantially higher dipole moment than the lower alcohols mentioned above.

Since the carbon dioxide and alcohol mixture is injected at a supercritical temperature and pressure, the injection systems exhibit Type 3 phase behavior. In Type 3 phase behavior there are three possible phases which can exist within certain temperature and pressure ranges. One of the phases is called the L2 phase. This phase is a liquid containing a much smaller amount of a minor component than the L1 liquid phase. This means that under certain conditions the addition of a small amount of a second compound can cause a supercritical carbon dioxide phase to condense into a higher density and higher viscosity liquid phase.

The following examples will further illustrate the novel carbon dioxide fracturing method of the present invention. These examples are given by way of illustration and not as limitations on the invention. Thus, it should be understood that the method and composition of the fracturing medium may be varied to achieve similar results in the scope of the invention.

EXAMPLES 1-7

A capillary viscometer was constructed to measure the viscosity of carbon dioxide and carbon dioxide mixtures at elevated temperatures and pressures. Table 1 indicates viscosity and density figures for pure carbon dioxide and mixtures of carbon dioxide and additive at the specified pressures and temperatures. The last column of Table 1 represents the viscosity enhancing factor which is defined as the mixture viscosity divided by the pure carbon dioxide viscosity. Ethylene glycol gave the best viscosity enhancing results.

TABLE 1

RESULTS OF VISCOSITY MEASUREMENTS ON CARBON DIOXIDE AND POLAR COMPOUND MIXTURES

| Ex | Additive | Wt % | P (psia) | T (°F.) | Pure $CO_2$ (g/cm$^3$) | (cp) | Mixture (g/cm$^3$) | (cp) | $E_f$ |
|---|---|---|---|---|---|---|---|---|---|
| 1 | Ethylene Glycol | 2.3 | 1235 | 108 | 0.299 | 0.0235 | 0.321 | 0.093 | 4.0 |
| 2 | Ethylene Glycol | 2.3 | 2025 | 153 | 0.448 | 0.0324 | 0.485 | 0.106 | 3.3 |
| 3 | n-Hexanol | 4.0 | 1530 | 159 | 0.273 | 0.0232 | 0.282 | 0.028 | 1.2 |
| 4 | Formaldehyde | 2.8 | 1800 | 157 | 0.361 | 0.0272 | 0.386 | 0.042 | 1.5 |
| 5 | n-Butanol | 7.8 | 1299 | 99 | 0.47 | 0.040 | 0.76 | 0.090 | 2.3 |
| 6 | n-Butanol | 7.8 | 1399 | 100 | 0.61 | 0.044 | 0.76 | 0.089 | 2.0 |
| 7 | n-Butanol | 7.8 | 1641 | 98 | 0.70 | 0.059 | 0.79 | 0.096 | 1.6 |

EXAMPLES 8-17

Severa) correlations between density and viscosity of pure hydrocarbon compounds and mixtures were evaluated in an effort to be able to predict the carbon dioxide viscosity enhancing ability of additives. The Dean-Stiel correlation noted in Dean, D. E. and Stiel, L. I., AIChE Journal, Vol. 11, pg. 526 (1965), and the Ely-Hanley correlation noted in Ely, J. F. and Hanley, H. J. M, Industrial Engineering Chemical Fundamentals, Vol. 20(4), pg. 323-332 (1981) gave very poor viscosity estimates from density data. The viscosity predictions were especially deficient in mixtures containing compounds with disparate molecular sizes.

The Hildebrand viscocity correlation noted in Hildebrand, J. H. and Lamoreaux, R. H., Procedures of the National Academy of Sciences, Vol. 69 (11), pg. 3428-3431 (1972) gave better viscosity predictions. The Hildebrand correlation was modified to give better correlation between actual measured viscosities and predicted measured viscosities. The modified Hildebrand correlation was employed to calculate the viscosity enhancement factor of Examples 8-17 in Table 2. The density data employed as a basis for Table 2 information came from the Ph.D. Thesis by R. A.

Snedeker of Princeton, previously cited. At certain temperatures and pressures methanol, propanol and octanol all gave excellent viscosity enhancing results.

TABLE 2

CARBON DIOXIDE-POLAR COMPOUND MIXTURE ENHANCEMENT FACTORS PREDICTED FROM SNEDEKER'S DENSITY DATA WITH HILDEBRAND CORRELATION

| Ex. | Additive | Wt % | T (°C.) | P (psia) | $E_f$ |
|---|---|---|---|---|---|
| 8 | Methanol | 0.73 | 35.0 | 1132 | 2.6 |
| 9 | Propanol | 2.17 | 35.0 | 1146 | 3.0 |
| 10 | Propanol | 1.22 | 35.0 | 1132 | 2.8 |
| 11 | Propanol | 1.36 | 35.0 | 1132 | 2.7 |
| 12 | Propanol | 0.14 | 35.0 | 1043 | 1.6 |
| 13 | Propanol | 0.95 | 35.0 | 1014 | 1.7 |
| 14 | Propanol | 0.95 | 35.0 | 911 | 1.1 |
| 15 | Propanol | 0.55 | 35.0 | 897 | 1.0 |
| 16 | Octanol | 2.33 | 31.6 | 1073 | 3.2 |
| 17 | Octanol | 3.75 | 31.6 | 1396 | 1.3 |

Many other variations or modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of fracturing an underground formation penetrated by a wellbore, which consists essentially of:
    injecting into an underground formation through a wellbore a mixture of carbon dioxide and a polar alcohol or polar glycol additive at a temperature and pressure above the critical temperature and pressure of carbon dioxide,
    said alcohol or glycol additive having less than about 9 carbon atoms and comprising about 0.1% to about 10% by weight of the injected mixture;
    said mixture injected with sufficient volume and pressure to cause a fracture to be formed in said underground formation.

2. The method of claim 1, wherein the injected mixture further comprises a proppant material.

3. The method of claim 1, wherein the additive is methanol.

4. The method of claim 1, wherein the additive is ethanol.

5. The method of claim 1, wherein the additive is ethylene glycol.

6. The method of claim 1, wherein the additive comprises about 1% to about 4% by weight of the injected mixture.

7. A method of fracturing an underground formation penetrated by a wellbore, which consists essentially of:
    injecting into an underground formation through a wellbore a mixture of carbon dioxide and ethylene glycol at a temperature and pressure above the critical temperature and pressure of carbon dioxide,
    said ethylene glycol comprising about 1% to about 4% by weight of the injected mixture,
    said mixture injected with sufficient volume and pressure to cause a fracture to be formed in said underground formation.

* * * * *